United States Patent
Stegerer et al.

(10) Patent No.: US 10,513,240 B2
(45) Date of Patent: Dec. 24, 2019

(54) CHAIN LINK AND LINK CHAIN

(71) Applicant: BROSE FAHRZEUGTEILE GMBH & CO. KOMMANDITGESELLSCHAFT, COBURG, Coburg (DE)

(72) Inventors: Mario Stegerer, Gundelsheim (DE); Fabian Lang, Ergersheim (DE); Michael Hoeppel, Bad Staffelstein (DE)

(73) Assignee: BROSE FAHRZEUGTEILE GMBH & CO. KOMMANDITGESELLSCHAFT, COBURG, Coburg (DE)

( * ) Notice: Subject to any disclaimer, the term of this patent is extended or adjusted under 35 U.S.C. 154(b) by 56 days.

(21) Appl. No.: 15/560,778

(22) PCT Filed: Apr. 6, 2016

(86) PCT No.: PCT/EP2016/057481
§ 371 (c)(1),
(2) Date: Sep. 22, 2017

(87) PCT Pub. No.: WO2016/162360
PCT Pub. Date: Oct. 13, 2016

(65) Prior Publication Data
US 2018/0079387 A1    Mar. 22, 2018

(30) Foreign Application Priority Data

Apr. 9, 2015    (DE) .................... 10 2015 206 360

(51) Int. Cl.
*B60R 22/03*    (2006.01)
*B60R 22/20*    (2006.01)
(Continued)

(52) U.S. Cl.
CPC .............. *B60R 22/03* (2013.01); *B60R 22/20* (2013.01); *F16G 13/20* (2013.01);
(Continued)

(58) Field of Classification Search
CPC . B60R 22/03; B60R 22/20; B60R 2022/1818; F16G 13/20; F16H 19/0636; F16H 2019/0613
(Continued)

(56) References Cited

U.S. PATENT DOCUMENTS 553,650 A    1/1896  Kingsland
1,870,244 A  8/1932  Elston
(Continued)

FOREIGN PATENT DOCUMENTS

CN    1121567 A    5/1996
CN    103410934 A  11/2013
(Continued)

OTHER PUBLICATIONS

CN First Office action issued in corresponding CN Application No. 201680020875.5 dated Mar. 21, 2019, 7 pages, with English translation, 3 pages.

*Primary Examiner* — Keith J Frisby
(74) *Attorney, Agent, or Firm* — Lewis Roca Rothgerber Christie LLP

(57) ABSTRACT

It is provided a chain link for a link chain which is flexible per se and in which chain links connected to each other are movable in relation to each other and can be locked to each other such that the link chain which is flexible per se can be stiffened by locking the chain links to each other. The chain link has at least a first connection segment for the connection to a first chain link and a further second connection segment for the connection to a second chain link. The chain link has a carrier having the first connection segment and has an (Continued)

adjustment part having the second connection segment, said adjustment part being supported in an adjustable manner relative to the carrier.

14 Claims, 17 Drawing Sheets

(51) Int. Cl.
  *F16G 13/20* (2006.01)
  *F16H 19/06* (2006.01)
  *B60R 22/18* (2006.01)

(52) U.S. Cl.
  CPC .. *F16H 19/0636* (2013.01); *B60R 2022/1818* (2013.01); *F16H 2019/0613* (2013.01)

(58) Field of Classification Search
  USPC ..................................................... 280/801.2
  See application file for complete search history.

(56) References Cited

U.S. PATENT DOCUMENTS

| | | |
|---|---|---|
| 2,481,471 A | 9/1949 | Crot |
| 3,153,940 A | 10/1964 | Patrignani |
| 3,234,698 A | 2/1966 | Kimblern |
| 5,803,418 A | 9/1998 | Hanson et al. |
| 2004/0245361 A1 | 12/2004 | Specht |
| 2008/0199295 A1 | 8/2008 | Scott et al. |
| 2009/0211220 A1* | 8/2009 | Scott ................ F16G 13/20 59/89 |
| 2010/0181819 A1 | 7/2010 | Birk et al. |
| 2011/0203248 A1 | 8/2011 | Mackert |
| 2015/0360641 A1 | 12/2015 | Warwel |

FOREIGN PATENT DOCUMENTS

| | | |
|---|---|---|
| DE | 4317427 A1 | 12/1994 |
| DE | 19522092 A1 | 1/1997 |
| DE | 10103490 A1 | 8/2002 |
| DE | 10325583 A1 | 1/2005 |
| DE | 102004036189 A1 | 3/2006 |
| DE | 102007039680 A1 | 2/2009 |
| DE | 102009009906 A1 | 8/2010 |
| DE | 102013001030 A1 | 7/2014 |
| WO | WO 2006/010484 A1 | 2/2006 |

* cited by examiner

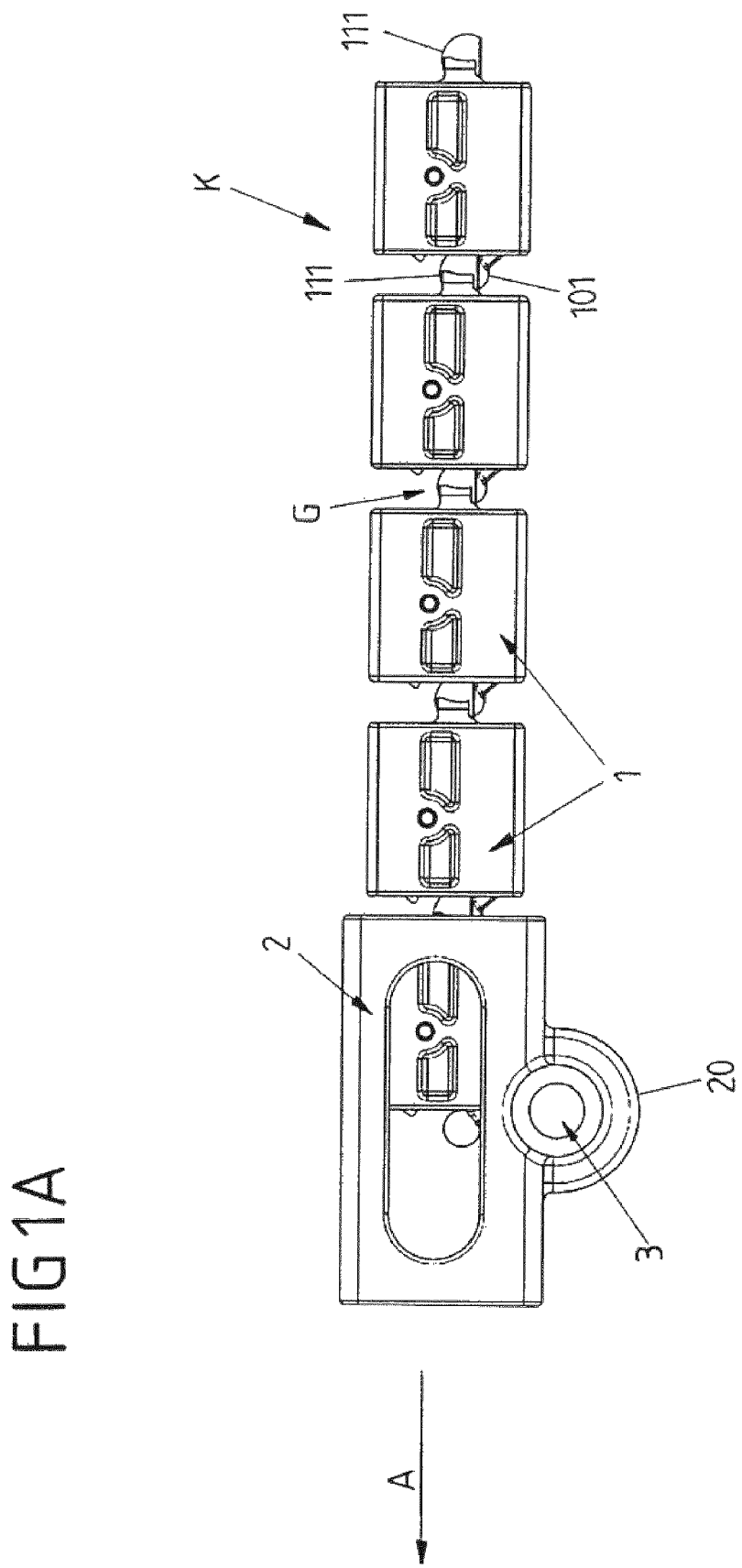

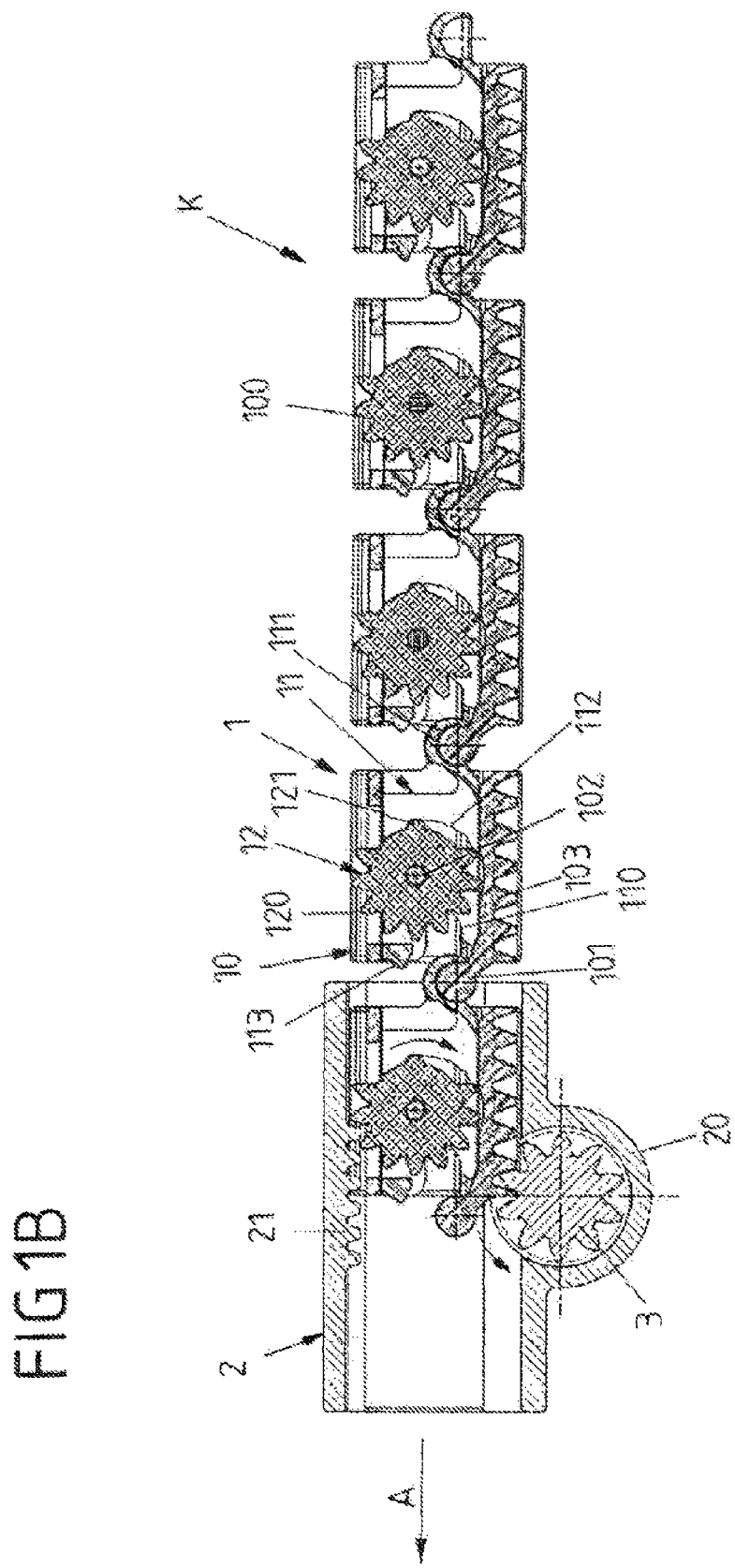

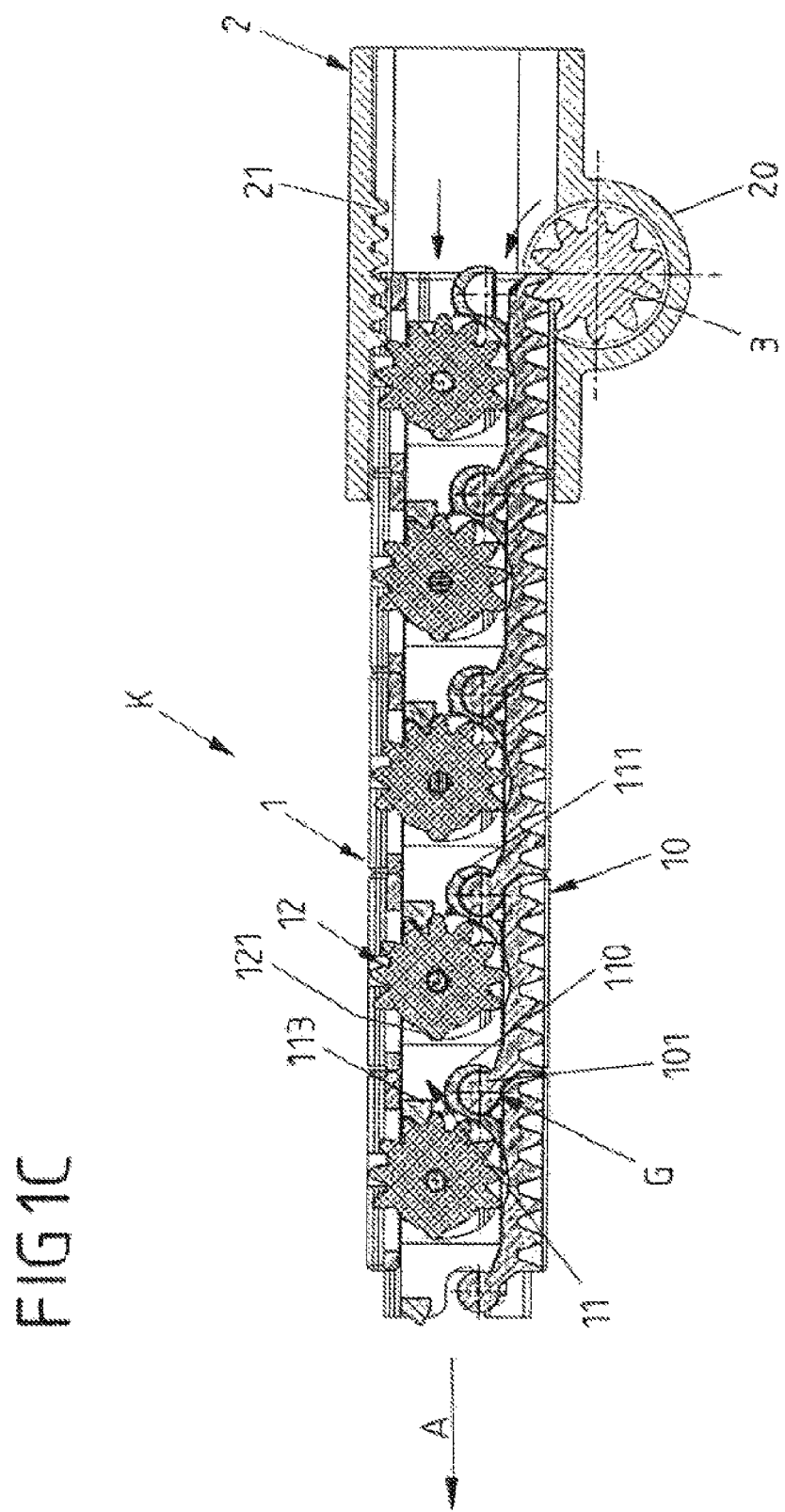

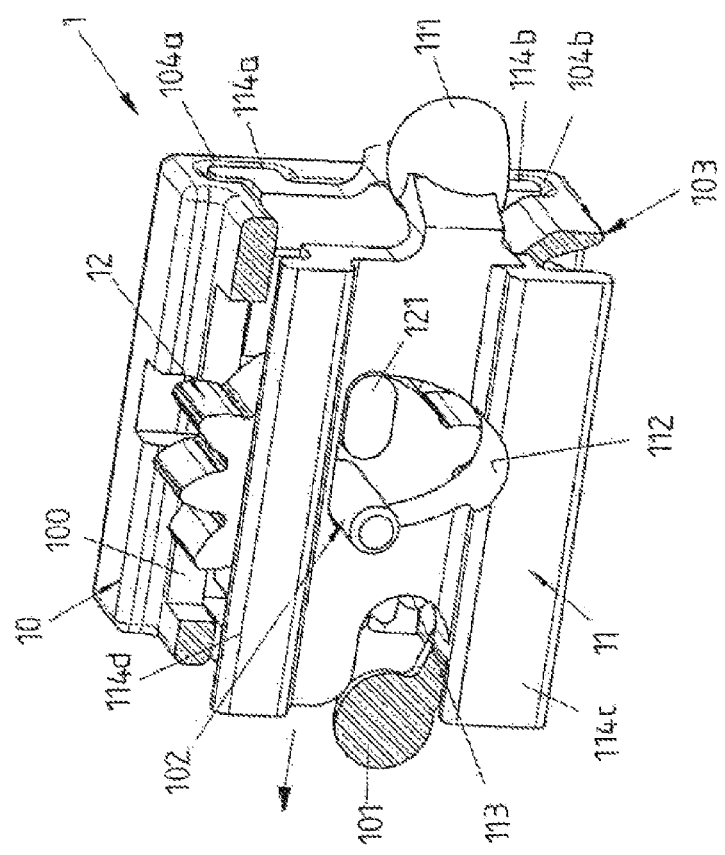

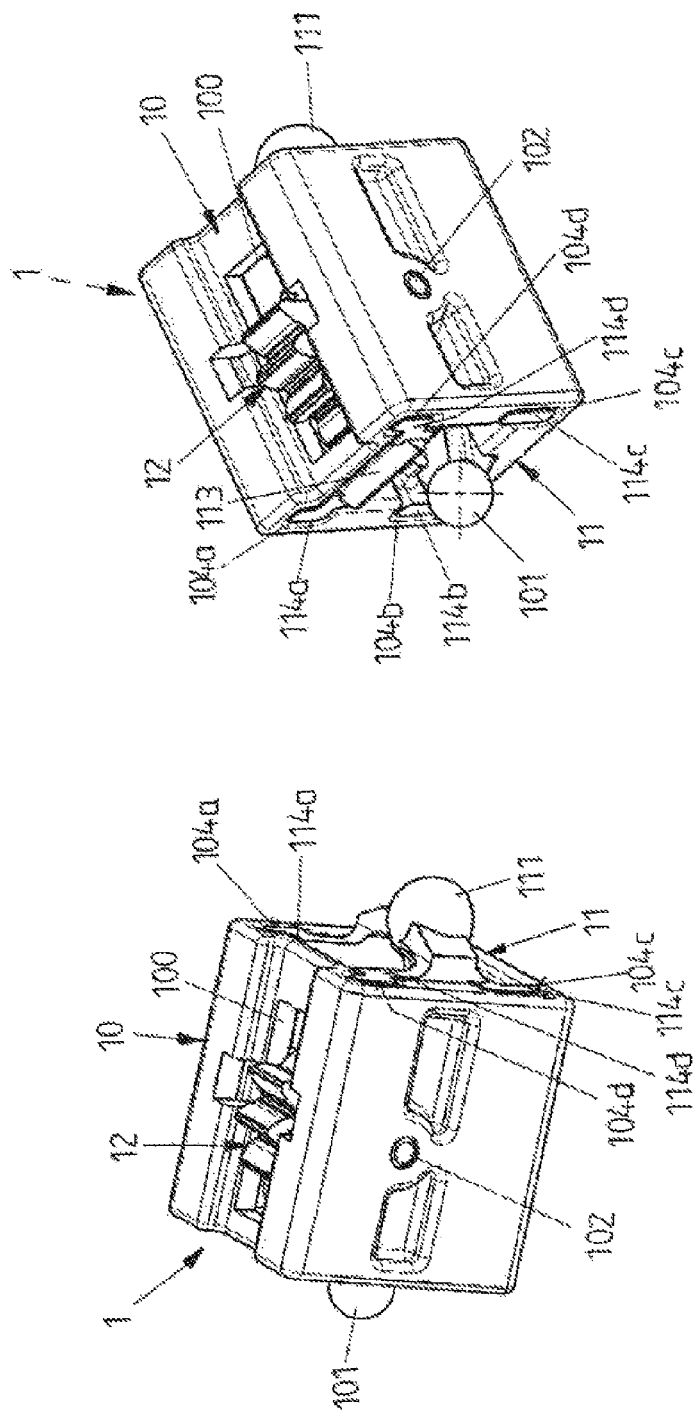

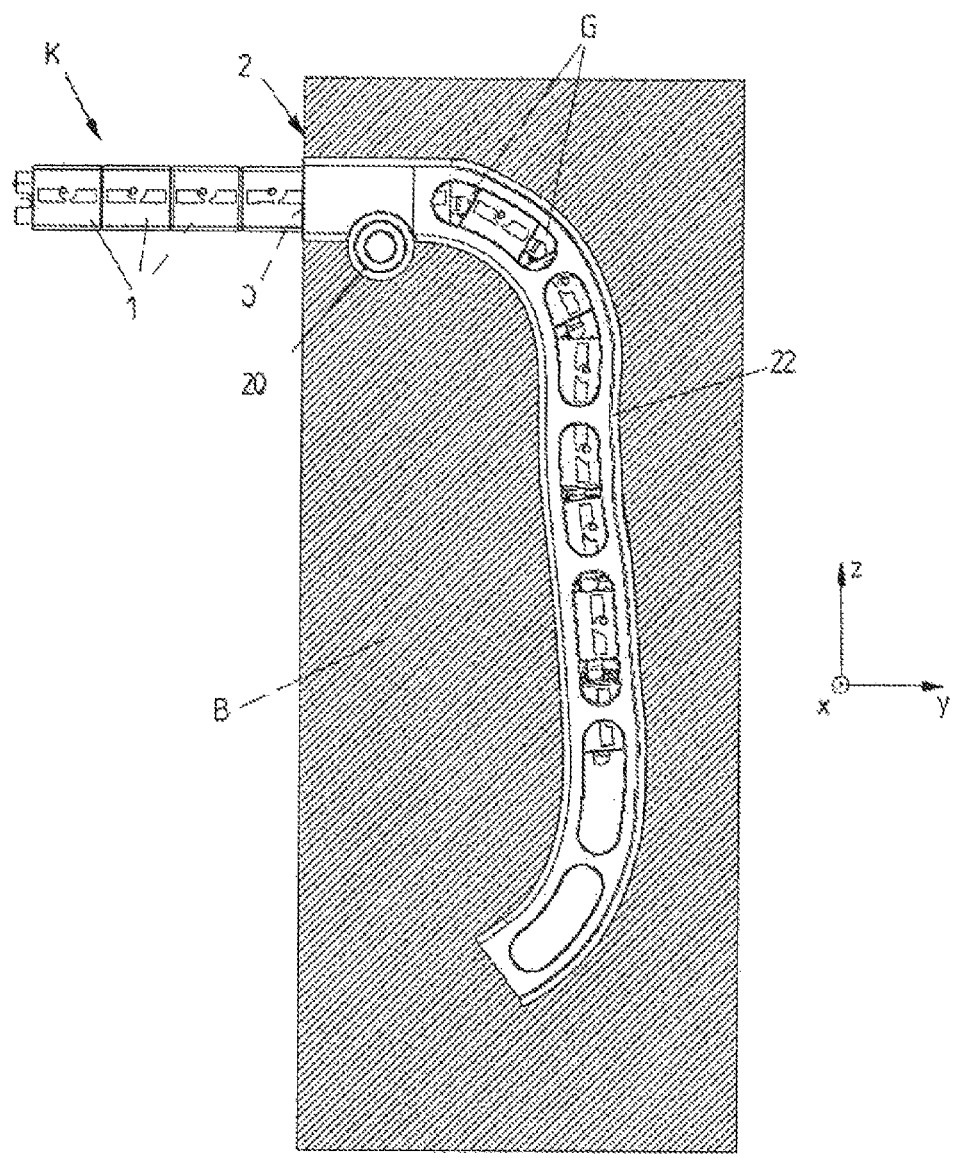

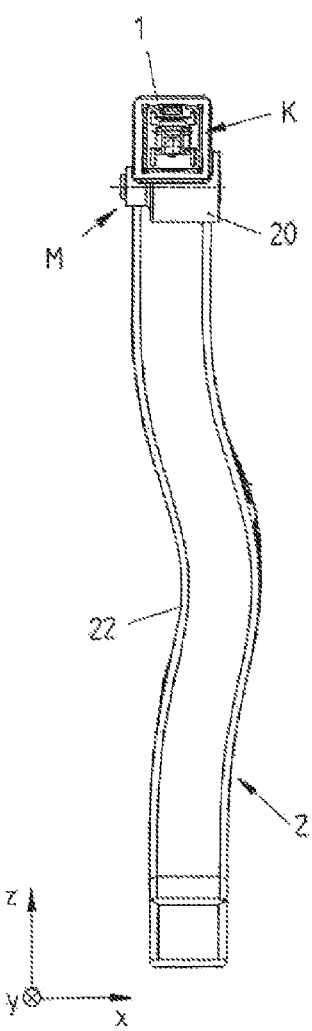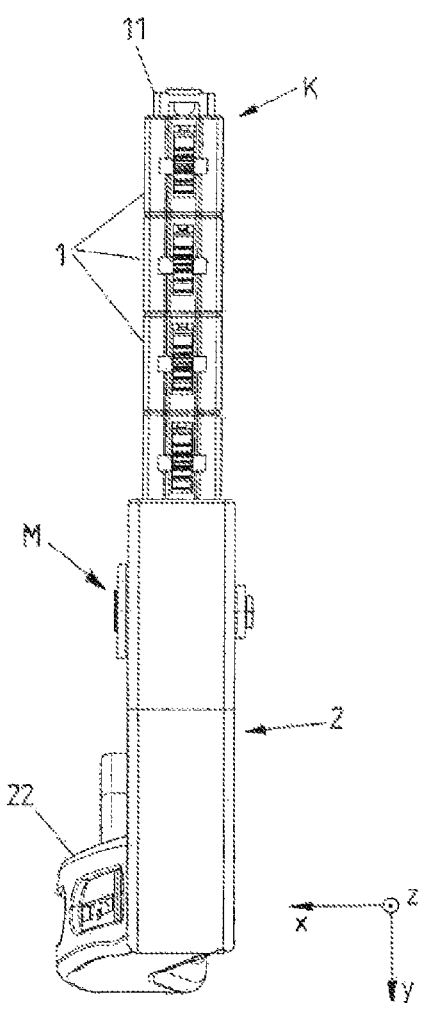

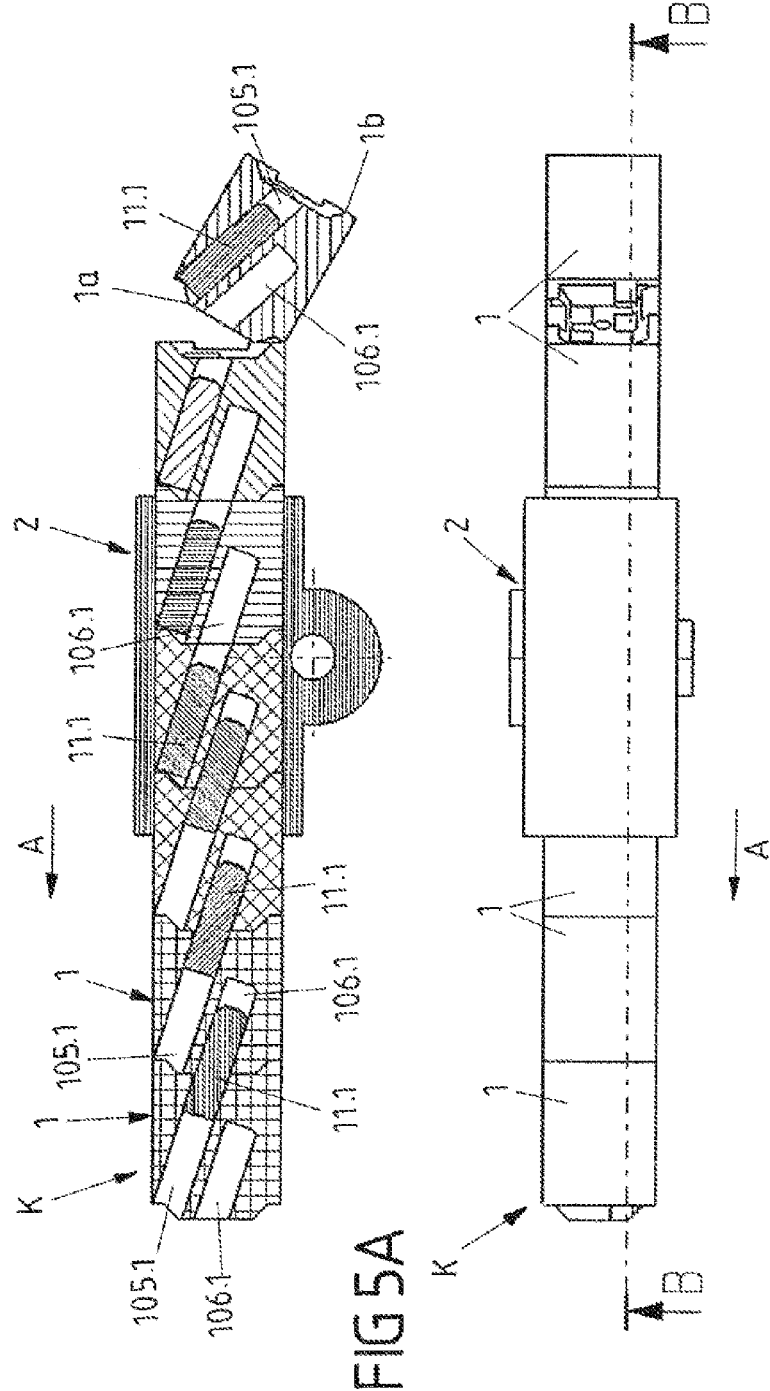

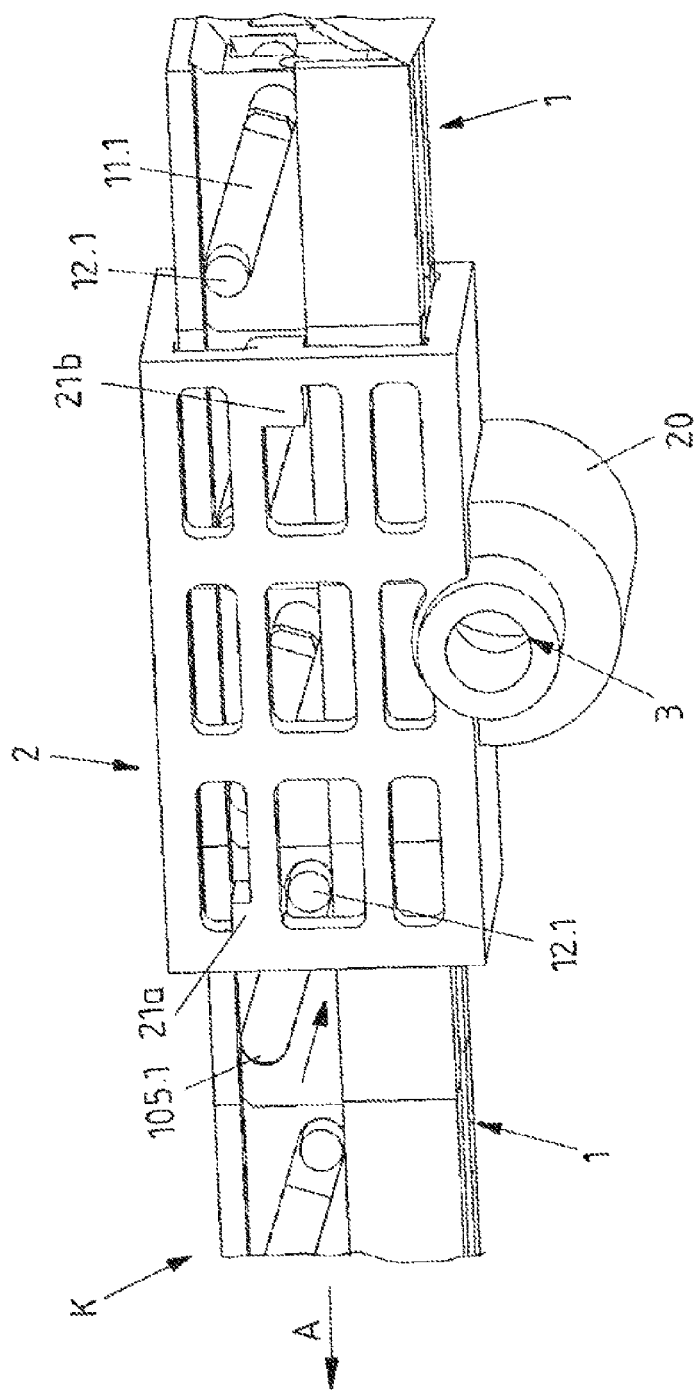

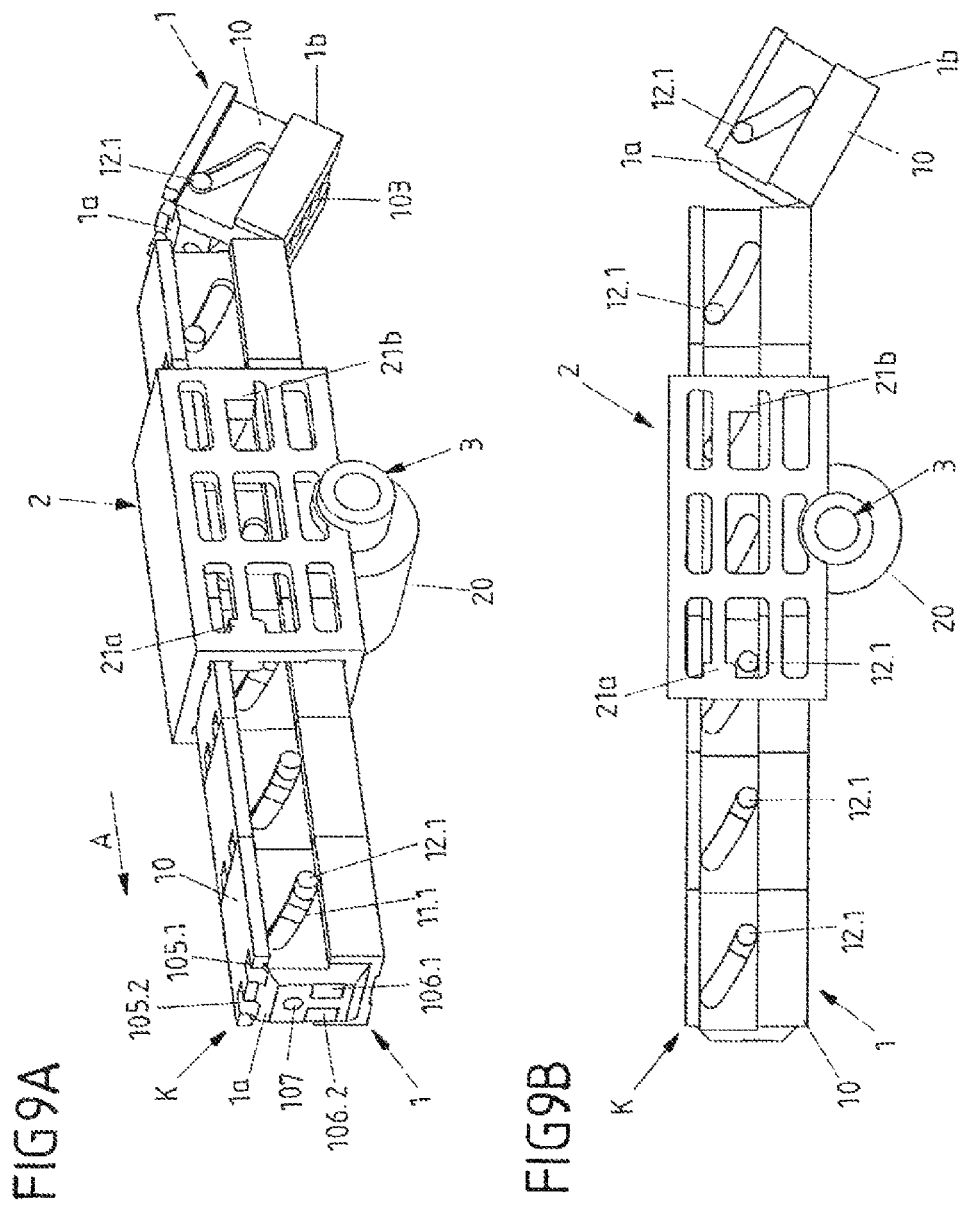

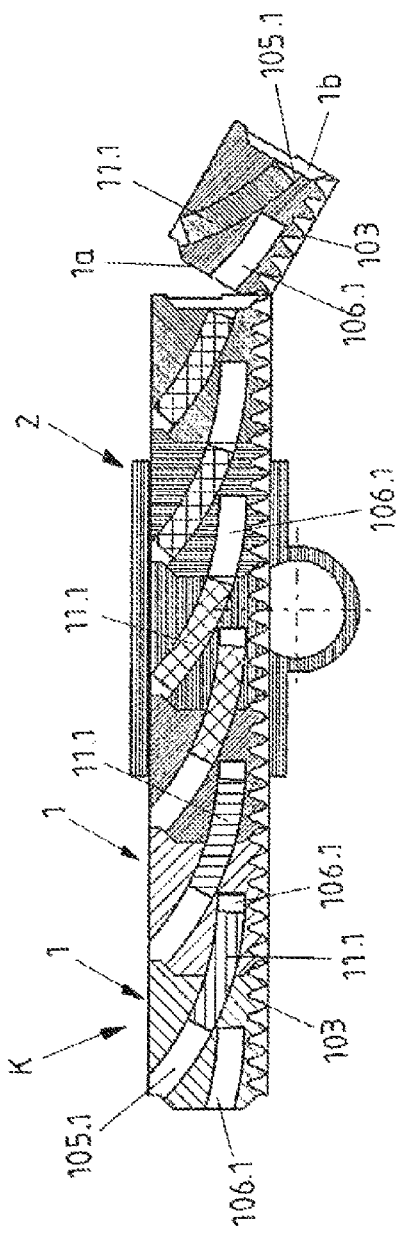

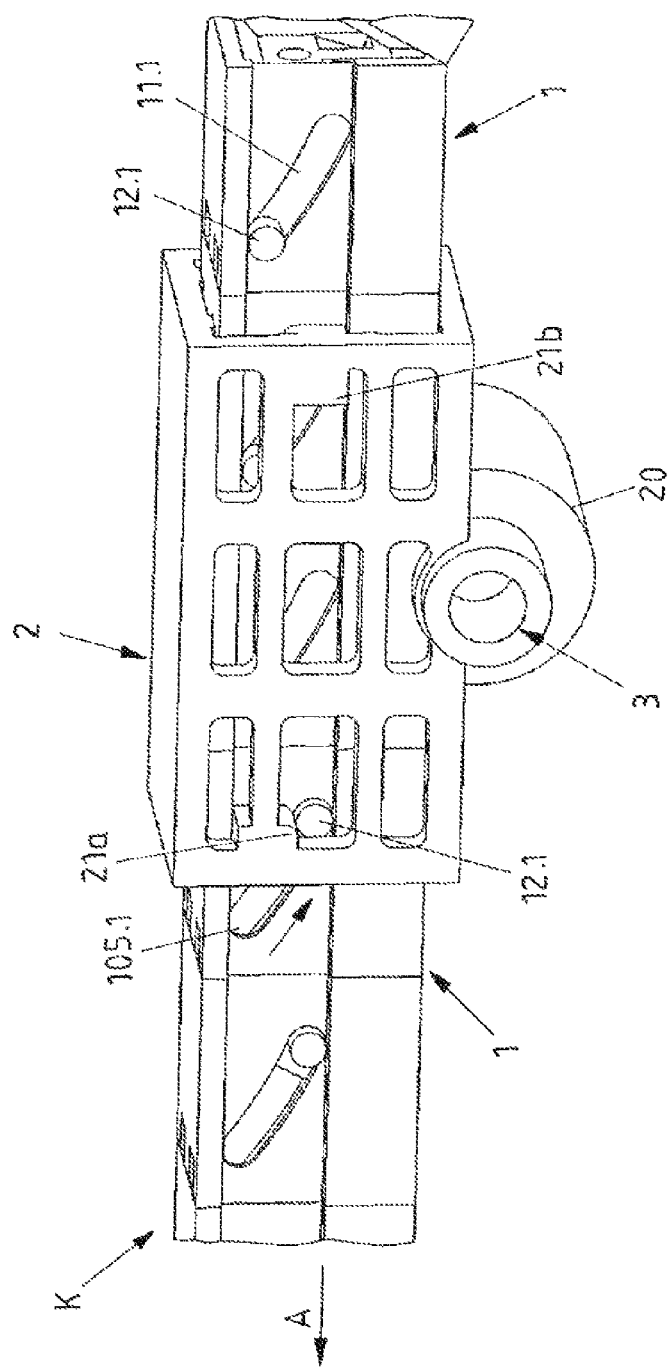

CHAIN LINK AND LINK CHAIN

CROSS-REFERENCE TO A RELATED APPLICATION

This application is a National Phase Patent Application of International Patent Application Number PCT/EP2016/057481, filed on Apr. 6, 2016, which claims priority of German Patent Application Number 10 2015 206 360.7, filed on Apr. 9, 2015, both of which are incorporated herein by reference.

BACKGROUND

The present invention relates to a chain link for a link chain which is flexible per se as.

In a flexible link chain which is constructed from a plurality of chain links connected together, the individual chain links are movable relative to one another in order to provide the link chain with flexibility and to be able to displace said link chain, for example, along a guide which does not extend in a linear manner. Moreover, link chains which are flexible per se are also known, in which the chain links are connected together so as to be movable but lockable to one another, so that the link chain which is flexible per se may be stiffened by locking the chain links together. For example, the individual chain links are pretensioned relative to one another via a spring-loaded pulling means so that the individual chain links are brought into positive-locking engagement with one another and, as a result, are fixed together rigidly and thus locked when a portion of the link chain is extended out of a holder. For example, the link chain which is flexible per se may be present as being wound up in a holder, in which in this case the individual chain links are unlocked from one another counter to a restoring force of the flexible pulling means. If the link chain is extended out of this holder, the individual chain links of an extended portion are automatically locked together so that the extended portion extends in a linear manner and is self-supporting.

Such link chains are used, for example, inside a vehicle in belt presenters. In this case, for example, a belt guiding element for a seat belt is adjusted via such a link chain in order to make it easier for a vehicle occupant to grasp the seat belt for fastening the seat belt. Seat belt presenters having such a link chain are disclosed, for example, in DE 10 2004 036 189 A1 or DE 10 2009 009 906 A1.

In particular, when using such a link chain in a vehicle, the conflict always has to be resolved, on the one hand, of achieving the greatest possible stability via the link chain in the extended state and, at the same time, of accommodating the link chain in a manner which is as compact as possible in the retracted state via the chain links which are movable relative to one another.

SUMMARY

Therefore, it is an object of the invention to provide a link chain which is improved in this regard.

This object is achieved by a chain link with features as described herein.

A chain link according to the invention is provided in this case for a link chain which is flexible per se and in which chain links connected to each other are movable in relation to each other and can be locked to each other such that the link chain which is flexible per se can be stiffened by locking individual chain links to each other. A chain link according to the invention has at least a first connection segment for the connection to a first chain link on a carrier of the chain link. For the connection to a further second chain link, a further second connection segment is provided on an adjustment part of the chain link according to the invention which is displaceably mounted relative to the carrier.

A better compromise between the mobility of the individual chain links relative to one another when said chain links are not locked together and the rigid connection thereof to one another when said chain links are locked, may be achieved via the at least two-part construction of a chain link according to the invention. Whilst in conventional link chains which are stiffened automatically, the individual chain links are designed without adjustable components and the locking of the individual chain links to one another is achieved solely by the chain links being moved closer together, for example due to spring pretensioning, the solution according to the invention permits via the adjustably mounted adjustment part an arrangement of each individual chain link or at least individual chain links of a link chain in order to lock a chain link to a chain link which is adjacent in the longitudinal direction of extension of the link chain, so that these two chain links are then rigidly connected together and the link chain is stiff in the corresponding portion.

The adjustment part may be adjustable relative to the carrier between a flexible position and a locked position, wherein in the flexible position a second chain link which is connected to the chain link according to the invention via the second connection segment is movable relative to the chain link, and in the locked position of the adjustment part a second chain link which is connected to the chain link according to the invention via the second connection segment is immovably fixed relative to the chain link according to the invention. By adjusting the adjustment part of a chain link relative to its associated carrier, therefore, two chain links may be locked together in a targeted manner and preferably also unlocked again.

To this end, in one exemplary embodiment a chain link according to the invention comprises a locking portion which locks the adjustment part in its locked position from being adjusted relative to the carrier when the chain link is connected as intended to a second chain link. In the locked state, the locking portion may be connected, for example by non-positive locking or positive locking, to a further element of a further chain link in order to secure in this manner the adjustment part which is present in its locked position and to lock said adjustment part from inadvertent release.

For cooperating with such a locking portion of a further chain link, in one variant it is provided that a chain link according to the invention in turn comprises a locking element which is designed to cooperate with a locking portion of a first chain link of the same construction and which is connected to the chain link according to the invention via the first connection segment. For example, when used as intended, a chain link according to the invention is arranged between two first and second chain links of the same construction. Via its adjustment part, the front (first) chain link is connected to the carrier of the central chain link, whilst the adjustment part of the central chain link is connected to the carrier of the rear (second) chain link. In the locked position of the adjustment part of the central chain link, therefore, for example a locking element attached to an end face locks the adjustment part of the front chain link from being adjusted relative to the carrier thereof. The locking portion of the central chain link arranged on a rear region in turn cooperates with a locking element of the rear chain link in order to secure the adjustment part of the central chain link in its locked position.

Preferably, the locking element of a chain link is provided for a non-positive locking connection and/or a positive locking connection to a locking element of a chain link which is of the same construction as the aforementioned chain link and which is connected to said chain link via the first connection segment on the carrier of the chain link according to the invention.

In one variant, the adjustment part of the chain link is configured and designed for a positive locking connection to a second chain link. To this end, the adjustment part is mounted, for example, on the carrier so as to be retractable and extendable. In a flexible position in which two similar chain links are movable relative to one another, the at least one adjustment part of such a chain link is retracted, and in a locked position in which the two similar chain links are fixed immovably relative to one another, said adjustment part is extended. In this case in one variant, the adjustment part in its locked position protrudes from the carrier and for locking to a further chain link may be pushed therein, in particular in the carrier thereof, in order to connect together the two chain links by positive locking and in order to lock said chain links in position relative to one another.

In order to control in a targeted manner the locking and unlocking of a chain link according to the invention with further chain links connected thereto, in one variant at least one force transmission element is provided. This force transmission element is arranged on the carrier and permits the transmission of an adjusting force applied from outside to the adjustment part, i.e. in the region of an outer face of the chain link, in order to adjust this adjustment part relative to the carrier. Via the force transmission element, an adjustment of the adjustment part relative to the carrier is preferably able to be controlled both in order to lock the chain link to a further chain link connected thereto and to connect said chain links together rigidly, and in order to release such a locking again so that the two chain links are movable again relative to one another and a portion of a link chain becomes flexible again thereby.

The force transmission element may also have the aforementioned locking portion. In principle, the locking portion in this case may be formed by a component which is mounted separately on the force transmission element. Preferably, however, the force transmission element itself forms the locking portion. The force transmission element in this case preferably secures the adopted locked position of the adjustment part via a locking element of a further chain link cooperating with its locking portion. In this case, without additional or further actuation from outside and thus the application of an adjustment force onto the force transmission element, the adjustment part is not adjusted into its flexible position and hence a locking of two chain links to one another may be released again.

For the transmission of an adjustment force to the adjustment part of the chain link, the force transmission element may be configured from a resilient material and/or in turn adjustably mounted on the carrier.

In the case of an adjustable force transmission element, said force transmission element is connected, for example, to a control element, for example in the form of a control cam, wherein the adjustment part then has a control contour against which this control element bears. Via the control contour, an adjustment movement relative to the carrier is predetermined for the adjustment part, by the control element being adjusted along the control contour by means of the force transmission element. Thus the adjustment part may be displaceably mounted, for example, relative to the carrier and a displacement of the adjustment part relative to the carrier may be controlled via the control element sliding along the control contour of the adjustment part.

Naturally, a reverse solution is also possible in which the adjustable force transmission element comprises the control contour and the adjustment part is connected to a control element which bears against the control contour and via which an adjustment movement relative to the carrier is predetermined for the adjustment part, by the control element being adjusted along the control contour.

In one exemplary embodiment, the force transmission element comprises a rotatably mounted gearwheel. Via this gearwheel which is rotatably mounted on the carrier and a control cam—preferably configured integrally therewith—in one variant, when the gearwheel is rotated, a displacement of the adjustment part is controlled relative to the carrier. At the same time, the gearwheel, for example via two teeth adjacent to one another, defines a locking portion in which a wedge-shaped or pin-shaped locking element of a further chain link of the same construction is able to engage in order to lock the gear wheel in a rotary position which corresponds to the locked position of the adjustment part. An external toothing of this gearwheel is preferably accessible via an opening on an outer face of the chain link so that the gearwheel may be driven from outside in order to adjust the adjustment part relative to the carrier. In this manner, two chain links may be locked to each other by rotating the gearwheel. The locking may also be released again in a targeted manner by the gearwheel being rotated in an opposing rotational direction. As already described above, a displaceably mounted adjustment part is preferably adjustable via the rotatable gearwheel.

In an alternative variant, a force transmission element is designed to be displaceable along a sliding guide, an adjusting force being able to be transmitted from outside by said force transmission element to the adjustment part which is optionally integrally configured with the force transmission element. The sliding guide, the guide slot thereof preferably being configured by the carrier of the chain link, in this case is able to predetermine an adjustment path extending in a linear manner or curved manner (once or repeatedly) for the force transmission element and associated therewith the at least one adjustment part. In one variant, an adjustment path which is curved once is predetermined via the sliding guide, for example, said adjustment path forcing the force transmission element into a displacement along a portion of a circular path.

In one variant, the individual chain link comprises at least two adjustment parts which are displaceably mounted relative to the carrier. The individual chain link in this case is designed at least in three parts. In this case, the at least two adjustment parts are provided for common locking to just one further chain link. To this end, the at least two adjustment parts may be extendable, for example, in different adjustment directions such as, on the one hand, obliquely upward and, on the other hand, obliquely downward on one and the same (rear) end face of the chain link in order to lock the chain link to a further second chain link. In a further variant, the at least two adjustment parts are displaceable toward one another with a movement component in order to lock the chain link to a further second chain link.

In the last-mentioned case, the at least two adjustment parts are thus also designed or mounted to be resiliently deformable such that when the two adjustment parts are extended relative to the carrier, so that the adjustment parts for locking to a further chain link protrude together from the carrier, the (superimposed) displacement thereof toward one another takes place counter to a restoring force. In this manner, in an extended state in which the adjustment parts are designed to engage in at least one receiver of a further chain link, the at least two adjustment parts may be forced to be (further) spaced apart from one another and thus produce a pretensioning force, via which a retention of the extended adjustment parts is improved in the at least one receiver of a further chain link.

For the displaceable mounting of the adjustment part relative to a carrier, irrespective of the use of a force transmission element with a gearwheel or the displaceable mounting thereof via a sliding guide, it is provided, for example, that at least one sliding portion of the adjustment part is displaceably received in a guide channel of the carrier. Such a sliding portion may, for example, take the form of a projection protruding transversely to the sliding direction. In one variant, the adjustment part comprises four sliding portions which protrude as projections in each case to the side of the adjustment part, such that as a result the adjustment part appears to be H-shaped in cross section. In such a variant, the displaceably mounted adjustment part is preferably pushed into a sleeve-shaped carrier which surrounds the adjustment part in the manner of a housing.

In order to permit via the chain link an adjustment force for adjusting the link chain, i.e. for example the retraction and extension thereof out of a holder, the carrier of a chain link preferably comprises a force application region which is designed and provided for cooperating with a drive element for adjusting the link chain. Such a force application region may comprise, for example, an external toothing. Via a drive pinion meshing with this external toothing, a chain link may be adjusted in a direction of extension in order to retract and extend the link chain.

As already mentioned in the introduction, a further feature of the present invention is the provision of a link chain having a plurality of chain links according to the invention and thus preferably of the same construction relative to one another. In this case, the chain links of the link chain are movable relative to one another in an unlocked state, so that as a result the link chain is flexible per se. The chain links are, however, lockable to one another via the adjustment parts which are respectively mounted in an adjustable manner relative to their carriers so that they are no longer movable relative to one another and the link chain is stiff in a portion of chain links locked together.

In this case, as also already partially mentioned above, by an adjustment of the adjustment part of a chain link relative to its carrier, a spacing between this carrier and the carrier of a further following chain link—for example relative to the adjustment direction of the adjustment part or the longitudinal direction of extension of the link chain—is reduced. By the adjustment of the adjustment part, therefore, for example a subsequent rear chain link is pulled on.

In an alternative variant, at least the adjustment part of a chain link is pushed into a further chain link in order to achieve thereby a positive locking connection between two chain links, said connection being locked in position and being able to be released again by adjusting the at least one adjustment part in order to make the link chain flexible.

Alternatively or additionally, by adjusting the adjustment part of a chain link of the link chain relative to its carrier, this chain link may be locked via a locking element provided on the adjustment part thereof to a further chain link—for example a chain link at the front, i.e. located in the direction of adjustment. When locking two chain links together, these chain links are preferably connected rigidly together, i.e. fixed immovably relative to one another until the locking is released again.

In one variant, the chain links of a link chain according to the invention are connected together in an articulated manner at their connection segments, in particular via a multi-axis joint, such as for example a ball joint. By the connection via a multi-axis joint between in each case a carrier and an adjustment part it may be achieved that the link chain has the greatest possible flexibility in the unlocked state of its chain links. The link chain, therefore, is movable within a plurality of spatial axes and in the unlocked state of the chain links is also able to be deflected in a plurality of spatial directions. Via a ball joint connection between the individual chain links, the link chain is ultimately flexible in all spatial directions. At the same time, however, via the at least two-part configuration of the individual chain links according to the invention with the carrier and the adjustment part which is adjustable relative thereto, the link chain may be stiffened in a very targeted manner, achieving a very good relative stability of the rigid connection of the locked chain links.

In order to lock in position a ball joint connection between the individual chain links and thus to connect the individual chain links rigidly together, in one exemplary embodiment it is further provided that each adjustment part of the individual chain links has a securing portion which is able to be slipped at least partially over the ball joint connection when the respective adjustment part is adjusted into its locked position. For example, the securing portion is configured as a securing jaw of U-shaped cross section on a front face of an adjustment part. If the adjustment part of a chain link is in its locked position, this securing jaw receives by positive locking a ball-socket pairing between the two connection segments of two chain links so that the two chain links which are locked together are (also) rigidly connected together thereby. As a result, for releasing the ball-socket pairing, in this case an adjustment part has to be initially adjusted again relative to its carrier, for example by rotating a gearwheel which is rotatably mounted on the carrier and which functions as a force transmission element of the respective chain link.

A link chain designed according to the invention is preferably provided for adjusting a functional element inside a vehicle. The link chain in this case is part of a vehicle sub-assembly which comprises at least one preferably motorized drive for adjusting the functional element in addition to the link chain. The link chain serves in this case for transmitting an adjusting force or drive force produced by the drive to the functional element.

The drive or an adjusting mechanism comprising this drive may in this case comprise, for example, a drive element for adjusting the link chain, as well as an adjustment contour, the individual chain links being able to be guided past said adjustment contour when adjusting the link chain. Whilst the drive element meshes, for example, with an external toothing on a carrier of the chain links in order to extend and retract the link chain, the adjustment contour serves for adjusting the adjustment parts of the individual chain links relative to the respective carrier when a chain link is guided past said adjustment contour. Via the drive element and the adjustment contour, therefore, ultimately two adjustment movements are controlled, on the one hand the adjustment of the individual chain links and thus the link chain via the action of force on the carriers of the chain links, and on the other hand a relative movement of the adjustment parts of the chain links relative to their carriers.

The adjustment contour in this case may be provided for non-positive locking contact and/or positive locking contact with a force transmission element which is preferably adjustably arranged on a carrier of a chain link, so that the force transmission element effects an adjustment of an adjustment part when a chain link is guided past the adjustment contour. For example, an adjustment contour is configured by a fixed toothed rod portion, a rotatably mounted gearwheel of the force transmission element meshing therewith when the respective chain link is guided past, in order to displace a preferably displaceably mounted adjustment part of this chain link relative to its carrier, the gearwheel being rotatably mounted thereon. In a further variant, an adjustment contour is configured by a stop which forces an adjustment movement onto a force transmission element via a sliding guide when a chain link is to be guided past said stop. The stop in this case is dimensioned and arranged such that the force transmission element is only able to be guided past said stop when the respective associated adjustment part has adopted an intended locked position (or with a reverse adjustment of the link chain an intended flexible position) relative to the carrier.

In principle, it is preferred that the locking and/or unlocking of individual successive chain links takes place via an adjustment contour, according to which of two possible adjustment directions the chain links are guided past an adjustment contour. In this case, different adjustment contours may also be provided, only locking or only unlocking being able to be implemented thereby, and namely depending on the adjustment direction in which the chain links are guided past said stop. For example, force transmission elements of the individual chain links cooperate only with a first adjustment contour when the link chain is extended in order to lock together the individual chain links. If the link chain is retracted again, the same force transmission elements cooperate only with a further second adjustment contour in order to make the chain links movable again relative to one another.

In one variant, the vehicle sub-assembly comprises an elongated guide on which or in which the link chain is present with chain links which are not locked together so as to be deflected around at least two different spatial axes. As already mentioned, by the at least two-part design of a chain link according to the invention, it is possible to provide a greater flexibility to a link chain when the individual chain links are not locked together and thus are not rigidly connected together, so that the link chain is also movable in a plurality of spatial directions.

A vehicle sub-assembly which has a link chain according to the invention may be designed and provided, for example, for adjusting a belt buckle or a buckle tongue of a seat belt or for adjusting a belt guiding element which is provided for guiding and/or deflecting a seat belt. Accordingly, such a vehicle sub-assembly may also comprise a belt presenter.

The above-mentioned guide, in which the link chain is present so as to be deflected about at least two different spatial axes when the chain links are not locked together, is arranged in this case, for example, in a B-column of the vehicle. Via a drive which is preferably electromotive, in this case chain links are extended from an outlet opening of the B-column and at the same time guided past an adjustment contour, via which the adjustment parts of the individual chain links are adjusted relative to their carriers and thus the chain links are locked together and rigidly connected together when extended. If the link chain is retracted again, by being guided past the adjustment contour in the opposing direction, the locking is released again so that the individual chain links are movable relative to one another again and thus the link chain may be deflected easily inside the guide.

BRIEF DESCRIPTION OF THE DRAWINGS

Further advantages and features of the invention are revealed in the following description of exemplary embodiments with reference to the figures.

FIG. 1A shows an exemplary embodiment of a link chain according to the invention with parts of a drive for adjusting the link chain and a guide from which the link chain may be extended.

FIG. 1B shows a sectional view of FIG. 1A.

FIG. 1C shows in a sectional view the link chain of FIGS. 1A and 1B in an extended state.

FIG. 2A shows in a perspective view a chain link according to the invention of a link chain of FIGS. 1A-1C with a carrier in section.

FIGS. 2B-2C show further perspective views of the chain link of FIG. 2A.

FIGS. 3A-3C show different views of a vehicle sub-assembly for a belt presenter with a link chain of FIGS. 1A-1C.

FIG. 4A-6 show different views of a further variant of a link chain according to the invention.

FIGS. 9A-11 show different views of a further variant of a link chain according to the invention.

DETAILED DESCRIPTION

Figure 4A:
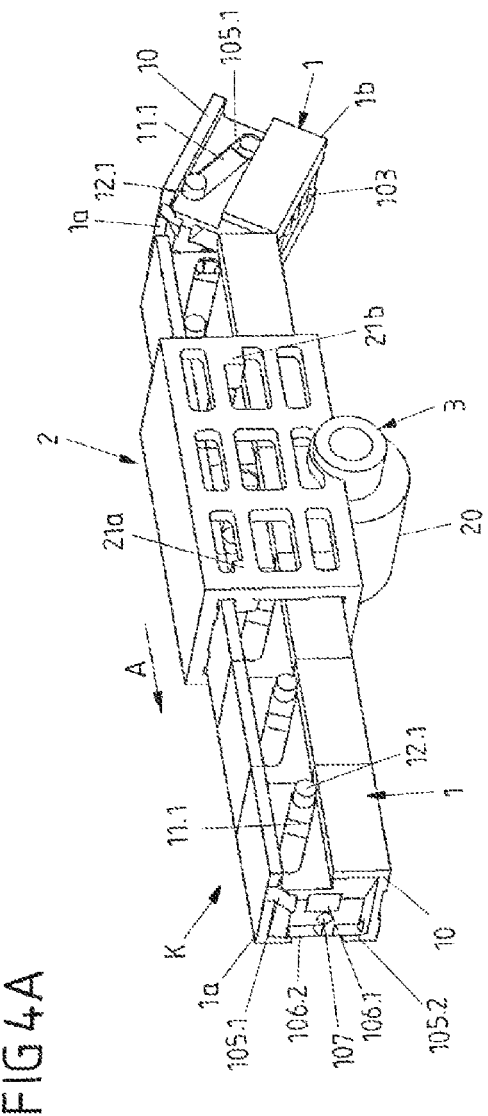

FIGS. 1A, 1B and 1C illustrate in different views a link chain K according to the invention which is constructed from a plurality of chain links 1—in this case configured to be cuboidal—which are connected together in an articulated manner. The individual chain links 1 in this case are connected together in an articulated manner in each case via a ball joint G with a ball-socket pairing, so that the link chain K is flexible per se and the individual chain links 1 are movable relative to one another within different spatial axes.

As is visible, in particular, with reference to the sectional views of FIGS. 1B and 1C, each chain link 1 is constructed in multiple parts and comprises, amongst other things, a sleeve-shaped carrier 10, an adjustment part displaceably mounted therein in the form of a sliding part 11 and a combined force transmission and locking element in the form of a locking gearwheel 12 which is rotatably mounted on the carrier 10. For the ball-socket pairing of a ball joint G, each sliding part 11 forms on a rear end of the respective chain link 1—relative to a direction of extension A—a connecting portion with a joint socket 111. In each case a joint head 101 rests in this joint socket 111, said joint head being configured on a front connection segment of the subsequent chain link 1. The carriers 10 of the chain links 1 are spaced apart from one another in their unlocked state, so that via the respective ball joint G a mobility relative to one another is provided in all three spatial directions.

In the present case, the individual chain links 1 are able to be locked and rigidly connected together via an adjustment mechanism so that a portion of the link chain K, in which the chain links 1 are locked together, is stiff. In this case, the individual chain links 1 are rigidly connected together and are no longer movable relative to one another until a locking of the chain links 1 to each other is released again. For the specific locking and unlocking of the individual chain links, the respective sliding part 11 is designed to be slidingly provided inside a carrier 10. Said sliding part is adjustable relative to the carrier 10 via the locking gearwheel 12, as will be explained hereinafter in more detail.

In order to adjust the initially flexible link chain G and to be able to extend it from a chain guide 2, a—preferably motorized—drive is provided, said drive driving a drive element in the form of a drive gearwheel 3. This drive gearwheel 3 is rotatably received in a housing portion 20 of the chain guide 2 and meshes with an external toothing 103 of the chain link 1 for the adjustment of the link chain K. This external toothing 103 in each case is configured in the manner of a toothed rod on an outer face of each carrier 10, so that the drive gearwheel 20 is able to adjust a chain link 1 along the guide 2 by engaging in the respective external toothing 103 and thus, depending on the rotational direction of the drive gearwheel 3, extend said chain link in the direction of extension A or retract said chain link again in the opposing direction.

In addition to the drive gearwheel 3 on the guide 2 an adjustment contour is configured by a toothed rod portion 21 which in the present case opposes the drive gearwheel 3 inside the guide channel formed by the chain guide 2. If, by rotating the drive gearwheel 3, a chain link 1 passes the fixed toothed rod portion 21, the locking gearwheel 12 which is rotatably mounted on the carrier 10 meshes therewith via its external toothing 120. As a result, the locking gearwheel 12 is rotated about a rotational axis 102—clockwise in FIG. 1B. The rotational axis 102 in this case is defined, for example, by a bearing pin, the locking gearwheel 12 being rotatably mounted thereon.

The length of the toothed rod portion 21 in this case is dimensioned such that when a chain link 1 is guided past, the locking gearwheel 12 mounted therein is rotated by approximately 180°. In this case, by the rotation of the locking gearwheel 12 the displaceably mounted sliding part 11 is displaced relative to the carrier 10 of the chain link 1—in the present case in the direction of extension A. In order to convert the rotation of the locking gearwheel 12 into a displacement movement of the sliding part 11 relative to its carrier 10, the locking gearwheel 12 forms a control element in the form of a control cam 121 integrally formed thereon. This control cam 121 is configured to protrude in a radial manner with a cam portion radially to the rotational axis 102 of the locking gearwheel 12. As a result, the control cam 121 bears against a control contour 112 of the sliding part 11. If the locking gearwheel 12 is rotated, the control cam 121 slides along the control contour 112 and thereby presses the sliding part 11 in the direction of extension A, whereby the sliding part 11 is displaced relative to the carrier 10.

With the relative movement of the sliding part 11 to its carrier 10, the sliding part 11 pulls on the carrier 10 of a subsequent chain link 1 since the sliding part 11 is connected via the ball joint G to the carrier 10 of the subsequent chain link 1. When adjusting a chain link 1 via the drive gearwheel 3, by the rotation of its locking gearwheel 12 associated therewith of a front chain link 1 in the direction of extension A, the subsequent chain link is consequently pulled onto the front chain link 1 (arranged at the front thereof) via the displacing sliding part 11. In the exemplary embodiment shown, in this case the subsequent chain link 1 is pulled sufficiently far onto the front chain link 1 that the subsequent chain link 1 comes into engagement with the drive gearwheel 3 and may be adjusted further in the direction of extension 3.

If now, in this subsequent chain link 1, the locking gearwheel 12 thereof is guided past the toothed rod portion 21, the sliding part 11 thereof is also displaced thereby in the direction of extension A. As a result, the sliding part 11 of the rear chain link 1 is partially pushed into the carrier 10 of the front chain link 1 which is designed in the manner of a housing, and these two chain links 1 are locked together and namely such that they are rigidly connected together.

To this end, by the inserted sliding part 11 the rotational position of the locking gearwheel 12 of the chain link 1 arranged in front is locked in position and a securing jaw 110 of the sliding part 11 is pushed over the joint G.

The locking of the rotational position of the gearwheel 12 takes place in this case via a locking element 113 which protrudes in the direction of extension A and which is pin-shaped or wedge-shaped in cross section. This locking element 113 is configured on an end face of the sliding part 11 of the respectively subsequent rear chain link 1. The locking element 113 in the locked state of the second chain link 1 engages in the external toothing 120 of the locking gearwheel 12 and thus locks this locking gearwheel in position. At the same time, via the securing jaw 110 which is pushed over the ball-socket pairing of the joint G, a (further) positive locking connection of the two chain links 1 is provided by which the two chain links 1 are no longer movable relative to one another. A portion of the link chain K, which is formed by chain links 1 which are locked together and which is extended out of the guide 2, is thus stiff and self-supporting. The individual chain links 1 of the extended portion of the link chain K are arranged in one another in a linear manner and rigidly connected together.

FIG. 1C illustrates such an extended portion of the link chain K, which has been extended over the drive gearwheel 3 and at an opening protrudes from the chain guide 2 substantially along a horizontal line. Whilst the chain links 1 are movable relative to one another in all spatial directions and the carriers 10 of the individual chain links 1 in their unlocked state, which is illustrated in FIGS. 1A and 1B, are spaced apart from one another, in the extended state of FIG. 1C the individual chain links 1 are locked together by positive locking, by in each case a sliding part 11 of a subsequent chain link 1 relative to the direction of extension A being at least partially introduced into the carrier 10 of the chain link 1 arranged in front. In this case, the individual carriers 10 also bear directly against one another.

With reference to FIGS. 2A, 2B and 2C further details of an individual chain link 1 are illustrated in different views.

Thus from these individual views of a chain link 1, in particular, an H-shaped cross-sectional profile of a sliding part 11 is visible. Thus the sliding part 11 in the variant shown is displaceably held in the sleeve-shaped carrier 10 via a plurality of sliding portions in the form of guide projections 114a to 114d protruding in the manner of projections transversely to the direction of extension A. The guide projections 114a and 114d, on the sliding part 11 which is cuboidal here, in each case are slidably received in guide channels 104a to 104d of the carrier 10.

An opening 100 is provided on an upper and lower face of the carrier 10, a part of the external toothing 120 of the locking gearwheel 12 protruding via said opening from the inside of the carrier 10. In this manner, via the adjustment contour of the toothed rod portion 21, an adjusting force is able to be transmitted from outside to the locking gearwheel 12 in order to adjust said locking gearwheel substantially by 180° and thereby to be able to displace the sliding part 11. The locking gearwheel 12 in this case is rotatably mounted substantially centrally on the carrier 10. The bearing pin defining the rotational axis 102 in this case penetrates a central through-opening on the sliding part 11. An edge of this through-opening forms in this case the control contour 112, the control cam 121 of the locking gearwheel 12 bearing thereagainst.

In FIGS. 2A to 2C a chain link 1 is shown in each case with its sliding part 11 in a flexible position in which two chain links 1 are connected in an articulated manner together and so as to be freely movable relative to one another. In this case the articulated head 101 protrudes on a first (front) end face of the chain link 1, whilst on the opposing second (rear) end face the joint socket 111 of the sliding part 11 protrudes from the carrier 10. If the sliding part 11 is displaced in the direction of extension A relative to the carrier 10, the securing jaw 113 may be pushed over the joint head 101 and the joint socket 111 of the chain link 1 located in the direction of extension A.

In particular, the locking element 113 which extends transversely to the direction of extension A and which is wedge-shaped in cross section is visible from FIG. 2C. This locking element is spaced apart from the joint head 101 and extends in the present case over almost the entire width of the sliding part 11.

The exemplary embodiment shown of a chain link 1 according to the invention permits a specific locking and unlocking of successive chain links 1 of the link chain K by its displaceably mounted sliding part 11 and the locking gearwheel 12, by said chain links being guided past the toothed rod portion 21 in different adjustment directions—on the one hand in the direction of extension A or in the opposing direction thereto. In this case, naturally instead of the toothed engagement a frictional contact might also be possible in order to set a rotatably mounted force transmission element, instead of the locking gearwheel 12, into a corresponding rotational movement.

By way of example, a use of the link chain K for a belt presenter is illustrated in different views in FIGS. 3A, 3B and 3C. FIGS. 3A to 3C show in this case a belt presenter adjustment module with an electromotive drive M for driving the drive gearwheel 3 and the chain guide 2 with a guide component 22 serving for the bearing of the retracted link chain K.

The elongated guide component 22 is provided for mounting in or on a B-column B of a vehicle interior. In this case, the guide component 22 is repeatedly bent around different spatial axes and/or in different spatial directions x and y. Due to the ball joint connection of the individual chain links, the link chain K in the unlocked state of the chain links 1 may easily cover the path of this guide portion 22. In this manner, there are no restrictions for accommodating the retracted link chain K inside a vehicle component such as the B-column B.

The link chain K in this case is stiffened only immediately before emerging from an outlet opening O of the B-column B via an adjusting mechanism comprising the drive M, the drive gearwheel 3 and the toothed rod portion 21. In the present case, the adjusting mechanism is provided here at an end of the chain guide 2 in the region of the outlet opening O so as to be able, on the one hand, to extend and retract the link chain K. Moreover, the chain links 1 to be extended thereby in the direction of extension A are locked together and rigidly connected together and the chain links 1 retracted in the opposing direction to the direction of extension A are unlocked again and the carriers 10 thereof are spaced apart from one another, by the sliding parts 11, when guided past the toothed rod portion 21, being displaced in or counter to the direction of extension A relative to their respective carrier 10.

One end of the link chain K which is able to be extended from the chain guide 2 is connected, for example, to a belt guiding element, not shown here, a portion of a seat belt being deflected thereon. In this manner, by extending the link chain K from the outlet opening O a belt portion with a belt tongue may be adjusted in the region of a vehicle seat in order to make it easier for a seat user to grasp the seat belt. Naturally, however, a different use for a link chain K which is flexible per se but stiffened when extended is also possible, such as for example the displacement of a belt buckle.

In FIGS. 4A to 8B and 9A to 13B, two further variants of a link chain K according to the invention are shown, said link chain in each case also being able to be used as a belt presenter as illustrated in FIGS. 3A, 3B and 3C. In contrast to the variants described above, a chain link 1 of a link chain K of the variants of FIGS. 4A to 8B and 9A to 13B in each case has two displacement parts 11.1 and 11.2 which for stiffening the link chain K are introduced into a common receiver or plurality of individual receivers 106.1, 106.2 of an adjacent chain link 1, so that via the positive locking connection produced thereby two chain links 1 are fixed together and thus locked in position relative to one another. The extension and retraction of the link chain K is also controlled here in each case via a drive with a drive gearwheel 3 which is rotatably mounted in a housing portion 20 and is able to mesh with an external toothing 103 of a carrier 10 of each chain link 1.

In the variant of FIGS. 4A to 8B and 9A to 13B, the individual chain links 1 are held against one another via a connecting element, not shown here, in the form of a cable, preferably a rubber cable. The cable extends in this case along the link chain K and is guided through through-openings 107 through the individual chain links 1 from the start to the end of the link chain K. In an unlocked state of two adjacent chain links 1 the individual chain links 1 are held against one another only via this (rubber) cable and accordingly are movable relative to one another.

In order to stiffen the link chain K when extended from the chain guide 2, each individual chain link 1 comprises two adjustment parts in the form of two connecting sliders 11.1 and 11.2. These connecting sliders 11.1 and 11.2 may be displaced relative to the carrier 10 of a chain link 1 and when extending the link chain K may be introduced into a subsequent chain link in order to connect two chain links by positive locking and rigidly together. The two connecting sliders 11.1 and 11.2 of a chain link 1 are in this case extended at a rear end face 1b of a chain link 1—relative to the direction of extension A—and as a result introduced into associated receivers 106.1 and 106.2 at a front end face 1a of a subsequent chain link. If the connecting sliders 11.1 and 11.2 of a chain link 1 engage in the associated receivers 106.1 and 106.2 of a subsequent chain link, these two chain links are fixed together in the direction of extension A and are no longer movable relative to one another. An extended portion of the link chain K formed thereby is thus stiff.

An extended slider pair of a chain link 1 thus forms on a (rear) end face 1b of a chain link 1 a second connection segment 111 for locking to a subsequent chain link of the link chain K. A receiver region 101 of a chain link 1 configured on an opposing (front) end face 1a of the same chain link 1 with openings for the receivers 106.1 and 106.2 forms in turn a first connection segment for locking to a previous chain link of the link chain K.

Each connecting slider 11.1, 11.2 of a chain link 1 is displaceably mounted inside the carrier 10 of this chain link 1. The displacement of the connecting sliders 11.1 and 11.2 relative to the respective carrier 10 is in this case controlled via two force transmission elements in the form of control pins 12.1 and 12.2. These control pins 12.1 and 12.2 in each case are displaceably held on opposing sides of the respective chain link 1 in a guide slot 105.1 or 105.2 of the carrier 10.

In the variant of FIGS. 4A-4B, 5A-5B, 6, 7A-7B and 8A-8B the guide slots 105.1 and 105.2 run in a linear manner and in each case slightly inclined relative to the direction of extension A. The guide slots 105.1 and 105.2 for the different connecting sliders 11.1 and 11.2 of a chain link 1 in this case also do not run parallel to one another so that different directions of adjustment are predetermined thereby for the connecting sliders 11.1 and 11.2. Thus relative to the direction of extension A one of the guide slots 105.1, 105.2 runs to the rear in the direction of the rear end face 1b of the chain link 1 and slightly obliquely downwardly, whilst the other of the two guide slots 105.1, 105.2 also runs to the rear in the direction of the rear end face 1b but instead runs slightly obliquely upwardly. The elongated connecting sliders 11.1 and 11.2 which are spaced apart from one another transversely to the direction of extension A thus protrude in different directions from the carrier 10 when said connecting sliders are extended and are intended to engage in a subsequent chain link (see, for example, FIG. 8).

For adjusting the individual connecting sliders 11.1 and 11.2 of a chain link 1 relative to the respective carrier 10 when retracting and extending the link chain K, the control pins 12.1 and 12.2, which are respectively configured integrally with the associated connecting sliders 11.1 and 11.2, cooperate with adjustment contours 21a and 21b provided on the chain guide 2. Each adjustment contour 21a and 21b in this case is configured with a stop. This stop protrudes transversely to the direction of extension A on the chain guide 2 in the direction of the chain links 1 to be guided past said stop, so that a control pin 12.1 or 12.2 of a chain link 1, which respectively slightly protrudes to the side, may not be guided past said stop.

Each adjustment contour 21a and 21b of the chain guide 2 is designed and dimensioned in this case with the respective stop such that the respective control pin 12.1 or 12.2 may only be guided past said stop in the direction of extension A or counter thereto when the control pin 12.1 or 12.2 has adopted one of the two possible end positions on the associated guide slot 105.1 or 105.2, in which the associated connecting slider 11.1 or 11.2 is either (fully) retracted or (fully) extended.

When extending the link chain K in the direction of extension A, therefore, a control pin 12.1, 12.2 of a chain link 1, via the one adjustment contour 21a, is forced into a displacement along its guide slot 105.1 or 105.2 until the respectively associated connecting slider 11.1 or 11.2 is fully extended and thereby engages in a subsequent chain link. Said control pin is able to be guided past the stop of the adjustment contour 21a only in the correct end position of the control pin 12.1 or 12.2.

When retracting the link chain K, it is exactly the reverse. The other, now effective, adjustment contour 21b of the chain guide 2 forces the control pin 12.1 or 12.2 into a displacement along its respective guide slot 105.1 or 105.2 so that the respective associated connecting slider 11.1 or 11.2 of a chain link 1 is retracted relative to the carrier 10 and is moved out of engagement with the subsequent chain link. Only then can the respective control pin 12.1 or 12.2 be guided past the stop of this adjustment contour 21b. A chain link 1 which is guided past the adjustment contour 21b counter to the direction of extension A is then no longer locked via its connecting slider 11.1 and 11.2 to a subsequent chain link 1 (relative to the direction of extension A) and as a result the link chain K is flexible again in this region.

With reference to FIGS. 7A, 7B and 8A, 8B an individual chain link 1 is shown in side view and rear view with retracted and extended connecting sliders 11.1 and 11.2. As is shown, in particular, using the rear views of FIGS. 7B and 8B, the connecting sliders 11.1 and 11.2, in this case in a retracted state which corresponds to the flexible position, are both located with their ends to be extended above a virtual transverse plane E extending parallel to the direction of extension A. In the extended state and thus the locked position, the connecting sliders 11.1 and 11.2 accordingly protrude from the carrier 10 on the rear end face 1b in different directions so that the ends thereof to be introduced into a subsequent chain link are located on different sides of this transverse plane E, on the one hand above, and on the other hand below, the transverse plane E. The non-parallel orientation of the two connecting sliders 11.1 and 11.2, which is associated therewith, and their directions of adjustment which are not parallel with one another, ensure a locking of two chain links in position via the positive locking connection produced by the connecting sliders 11.1 and 11.2 and prevent an automatic release of the connection of the two chain links to be locked in position. Additionally, in the case of a force acting on the stiffened chain link K between the chain links, a force transmission takes place over larger surfaces so that the stiffness of the link chain K is increased transversely to the direction of extension A.

The variant of FIGS. 9A-9B, 10A-10B, 11, 12A-12B and 13A-13B coincides in substantial parts with the aforementioned variant of FIGS. 4A to 8B. Also in this case two connecting sliders 11.1 and 11.2 which are displaceably mounted on a carrier 10 are provided on each individual chain link 1 of the link chain K, a locked positive locking connection with a subsequent chain link being able to be achieved by said connecting sliders when the chain link K is extended. Moreover, the adjustment of the two connecting sliders 11.1 and 11.2 of a chain link 1 is also controlled by two control pins 12.1 and 12.2 as force transmission elements, by means of adjustment contours 21a and 21b of the chain guide 2.

In contrast to the aforementioned variant, however, in this case a guide slot 105.1, 105.2 for the control pins 12.1, 12.2 does not run in a linear manner but has a curved path. Moreover, both guide slots 105.1, 105.2 of the sliding guides of a chain link 1 run parallel to one another, said sliding guides predetermining the adjustment movement of the connecting sliders 11.1 and 11.2. The two connecting sliders 11.1 and 11.2 of a chain link 1 are, therefore, (substantially) retracted and extended along parallel adjustment paths. The ends of the connecting sliders 11.1 and 11.2 to be extended are thus always located on the same side of the transverse plane E as is illustrated with reference to the rear views of the FIGS. 12B and 13B in an individual view of a chain link 1.

The two connecting sliders 11.1 and 11.2 of a chain link 1 of the variant according to FIGS. 9A to 13B are in the present case provided on the carrier 10 of the chain link 1 transversely to the direction of extension A of the link chain K with a certain resilience, so that when extended from the carrier 10 and inserted into the receivers 106.1 and 106.2 of a subsequent chain link 1 the connecting sliders 11.1 and 11.2 may be displaced slightly toward one another. The insertion openings for the receivers 106.1 and 106.2 on the front end face 1a of a subsequent chain link in this case are designed (for example by a corresponding chamfer and/or spacing of the two insertion openings and/or a corresponding physical guide in the receivers 106.1, 106.2) such that a connecting slider 11.2 or 11.2 inserted into the receivers 106.1 and 106.2 is displaced transversely to its insertion direction and namely in the direction of the adjacent connecting slider 11.2 or 11.1. The connecting sliders 11.1 and 11.2 extended to the rear on a rear end face 1b of a chain link 1 are thus always forced into a movement component toward one another when they are introduced into a subsequent chain link.

Figure 12A:
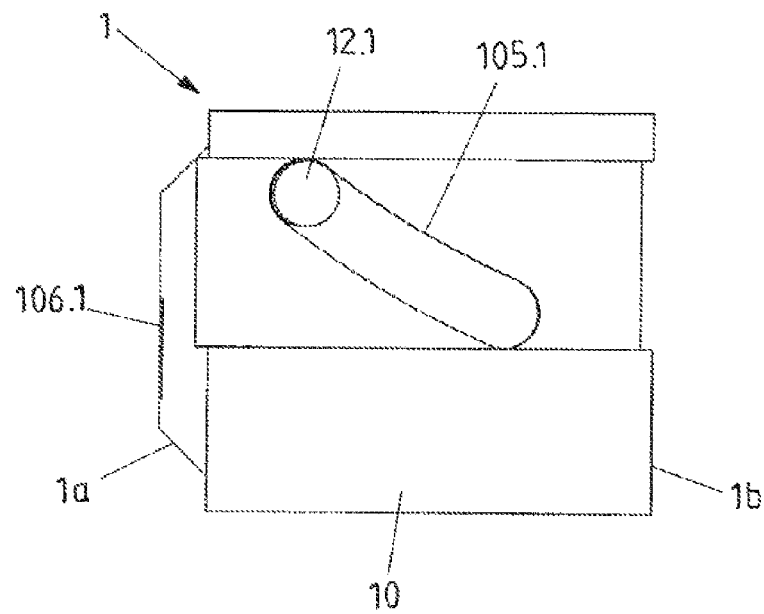
FIGS. 12A-12B show different views of a chain link of the link chain of FIGS. 9A-9B, 10A-10B and 11 with two retracted adjustment parts.
Figure 12B:
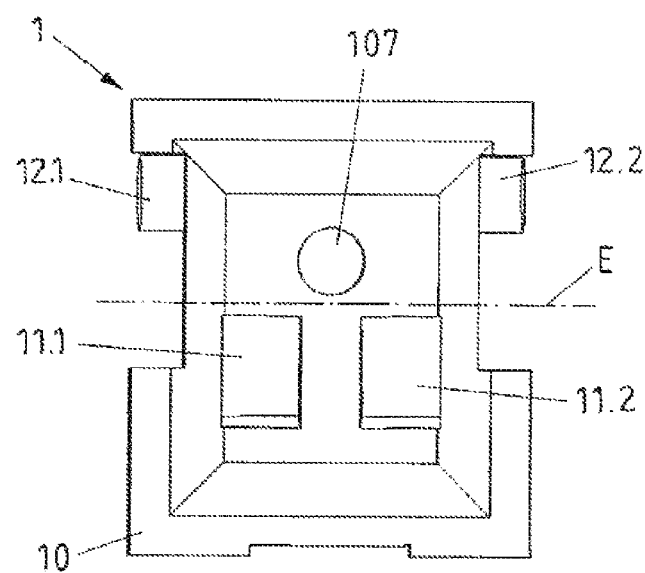
Figure 13A:
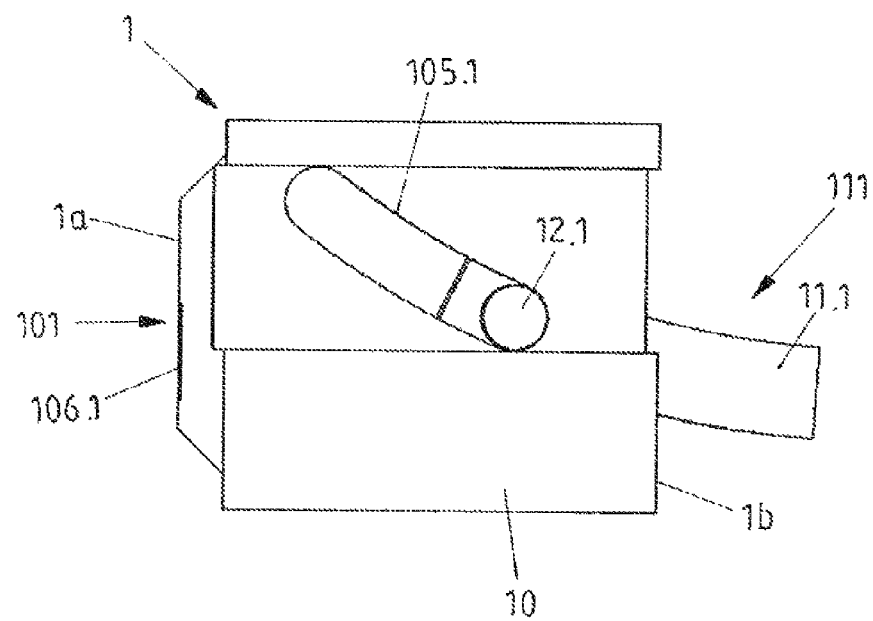
FIGS. 13A-13B show in views coinciding with FIGS. 12A-12B the chain link with extended adjustment parts to be adjusted relative to one another.
Figure 13B:
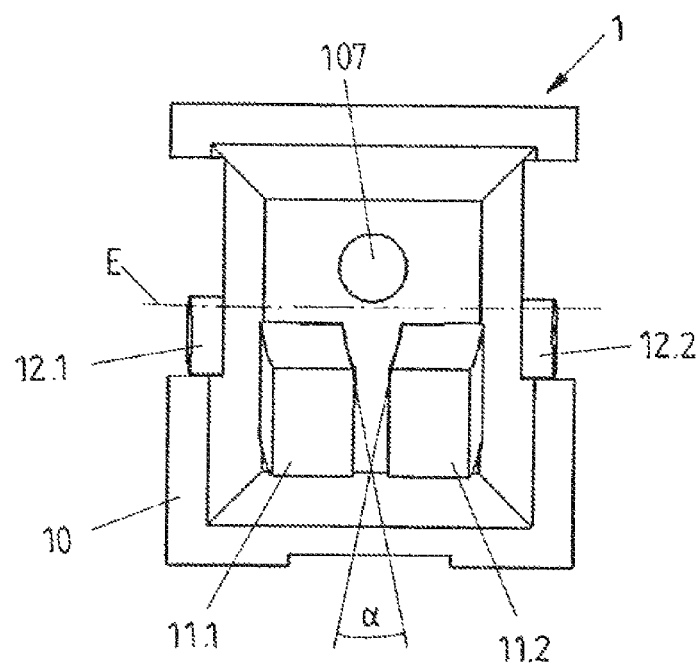

With reference to the rear view of FIG. 13B, an acute angle α at which the extended connecting sliders 11.1 and 11.2 run toward one another is illustrated by way of example, whilst in the retracted state the connecting sliders are oriented parallel to one another (see FIG. 12B). By the resilient deformation associated therewith, when the connecting sliders 11.1 and 11.2 are inserted into a subsequent chain link, a pretensioning force which is oriented transversely to the direction of extension A acts between the chain links 1, via which pretensioning force the locking of the chain links to one another is additionally assisted and thereby an increased strength of the reinforced portions of the link chain K is achieved. Reduced wear may also be achieved thereby with repeated retraction and extension of the link chain K in the region of the connecting sliders 11.1 and 11.2 and additionally vibrations and production tolerances, as a result of manufacture, may be compensated.

LIST OF REFERENCE NUMERALS

K Link chain
1 Chain link
1a (Front) end face
1b (Rear) end face
10 Carrier
100 Opening
101 Articulated head (1st connection segment)
101 Insertion region (1st connection segment)
102 Rotational axis
103 External toothing of carrier
104a-104d Guide channel
105.1, 105.2 Guide slot
106.1, 106.2 Receiver
107 Through-opening
11 Sliding part (adjustment part)
11.1, 11.2 Connecting slider (adjustment part)
110 Securing jaw
111 Joint socket (2nd connection segment)
111 Extended slider pair (2nd connection segment)
112 Control contour
113 Locking element
114a-114d Guide projection (sliding portion)
12 Locking gearwheel (force transmission element)
12.1, 12.2 Control pin (force transmission element)
120 External toothing
121 Control cam (control element)
2 Chain guide
20 Housing portion
21 Toothed rod portion (adjustment contour)
21a, 21b Adjustment contour
22 Guide portion
3 Drive gearwheel (drive element)
A Direction of extension
B B-column
E Transverse plane
G Ball joint
M Drive
O Outlet opening
α Angle

The invention claimed is:

1. A chain link for a link chain, the link chain being flexible per se and having a plurality of chain links connected to each other, the chain links being movable in relation to each other and being lockable to each other such that the link chain is able to be stiffened, wherein the chain link has at least a first connection segment configured to connect to a first other chain link and a further second connection segment configured to connect to a second other chain link,
   wherein the chain link has a carrier having the first connection segment and has an adjustment part having the second connection segment, said adjustment part being supported in an adjustable manner relative to the carrier,
   wherein the adjustment part is adjustable relative to the carrier between a flexible position and a locked position, wherein in the flexible position the second other chain link which is connected to the chain link via the second connection segment is movable relative to the chain link and wherein in the locked position the second other chain link is immovably fixed relative to the chain link,
   wherein the chain link comprises a locking portion which in its locked position locks the adjustment part from being adjusted relative to the carrier when the chain link is connected to the second other chain link, and
   wherein the carrier comprises at least one force transmission element for transmitting an adjusting force to the adjustment part in order to adjust the adjustment part relative to the carrier, wherein the force transmission element has the locking portion.

2. The chain link as claimed in claim 1, wherein the chain link comprises a locking element which is designed to cooperate with a locking portion of the first other chain link, in order to lock the locking portion of the first other chain link in a locked position.

3. The chain link as claimed in claim 1, wherein the adjustment part is configured and designed for a positive locking connection to the second other chain link and the adjustment part is mounted on the carrier so as to be retractable and extendable and wherein in its flexible position the adjustment part is retracted and in its locked position is extended, wherein the adjustment part in its locked position protrudes from the carrier for the positive locking connection to the second other chain link.

4. The chain link as claimed in claim 3, wherein the force transmission element comprises a rotatably mounted gearwheel or is displaceable along a sliding guide.

5. The chain link as claimed in claim 1, wherein the force transmission element is adjustably mounted on the carrier.

6. The chain link as claimed in claim 5, wherein
   the adjustable force transmission element is connected to a control element and the adjustment part has a control contour against which the control element is configured to bear and via which an adjustment movement relative to the carrier is predetermined for the adjustment part by the control element being adjusted along the control contour, or the adjustable force transmission element comprises a control contour and the adjustment part is connected to a control element which is configured to bear against the control contour and via which an adjustment movement relative to the carrier is predetermined for the adjustment part by the control element being adjusted along the control contour.

7. The chain link as claimed in claim 1, wherein the adjustment part is displaceably mounted relative to the carrier.

8. A link chain having a plurality of chain links as claimed in claim 1, wherein the chain links are movable relative to one another in an unlocked state so that the link chain is flexible per se, and wherein the chain links are lockable to one another so that they are not movable relative to one another and wherein the link chain is stiff where the chain links are locked together.

9. The link chain as claimed in claim 8, wherein the adjustment part of one of the chain links is configured to be adjusted relative to its carrier such that a spacing between the carrier of the one of the chain links and the carrier of an adjacent one of the chain links is reduced.

10. The link chain as claimed in claim 8, wherein the adjustment part of one of the chain links is configured to be adjusted relative to its carrier such that the one of the chain linksis locked via a locking element provided on the adjustment part thereof to an adjacent one of the chain links.

11. The link chain as claimed in claim 8, wherein the chain links are connected together in an articulated manner at their respective connection segments via a multi-axis joint.

12. A vehicle sub-assembly for adjusting a functional element inside a vehicle via a drive of the vehicle sub-assembly, wherein a link chain is provided for transmitting an adjusting force to the functional element, the link chain having a plurality of chain links, wherein each of the chain links has at least a first connection segment configured to connect to a first other chain link and a further second connection segment configured to connect to a second other chain link, wherein each chain link has a carrier having the first connection segment and has an adjustment part having the second connection segment, said adjustment part being supported in an adjustable manner relative to the carrier, and wherein each of the chain links are movable relative to one another in an unlocked state so that the link chain is flexible per se, and wherein the chain links are lockable to one another so that they are no longer movable relative to one another and the link chain is stiff where the chain links are locked together.

13. The vehicle sub-assembly as claimed in claim 12, wherein a drive element is provided for adjusting the link chain, as well as an adjustment contour, the chain links being able to be guided past said adjustment contour when adjusting the link chain, wherein the adjustment contour is designed for adjusting the adjustment parts of each respective chain link relative to a respective carrier when the respective chain link is guided past said adjustment contour.

14. The vehicle sub-assembly as claimed in claim 12, wherein the vehicle sub-assembly comprises an elongated guide on which or in which the chain links are not locked together so as to be configured to be deflected around at least two different spatial axes.

\* \* \* \* \*

UNITED STATES PATENT AND TRADEMARK OFFICE
CERTIFICATE OF CORRECTION

PATENT NO. : 10,513,240 B2  
APPLICATION NO. : 15/560778  
DATED : December 24, 2019  
INVENTOR(S) : Mario Stegerer et al.

Page 1 of 1

It is certified that error appears in the above-identified patent and that said Letters Patent is hereby corrected as shown below:

In the Drawings

Figure 4B:
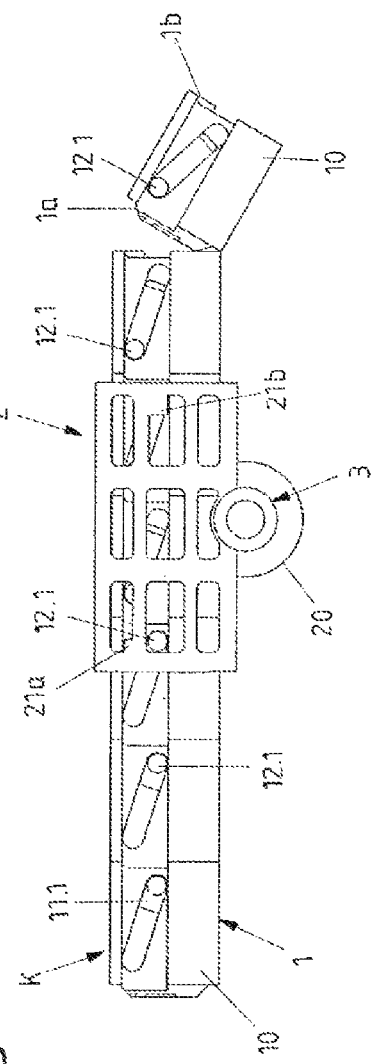
Figure 7A:
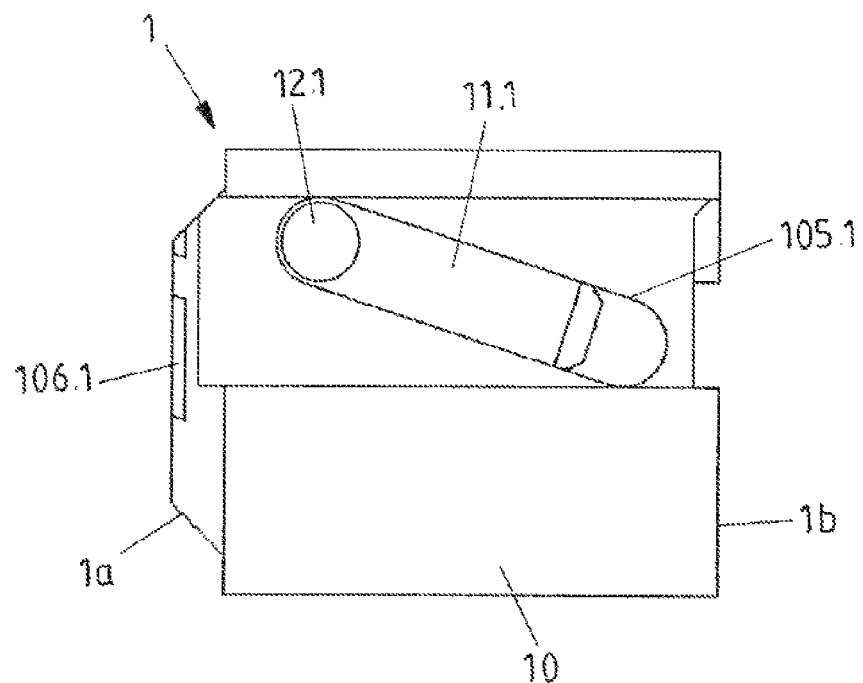
FIGS. 7A-7B show different views of a chain link of the link chain of FIGS. 4A-4B, 5A-5B and 6 with two retracted adjustment parts.
Figure 7B:
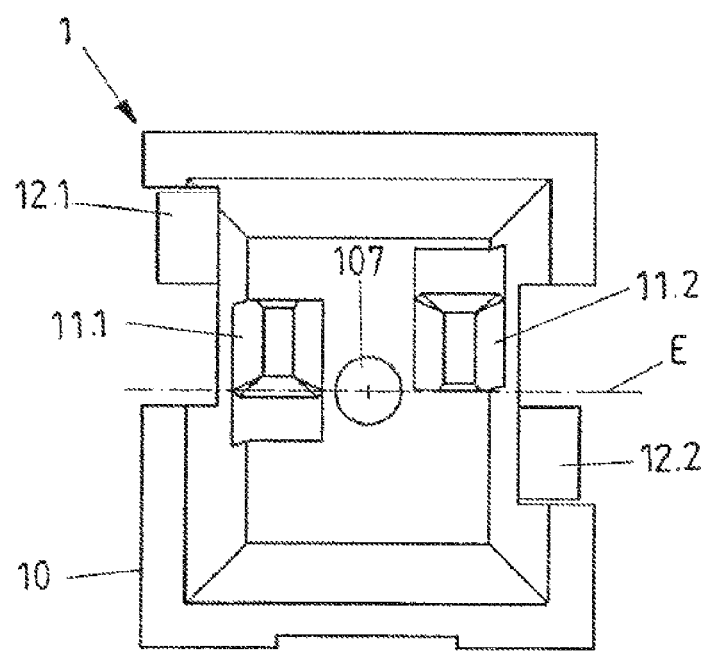
Figure 8A:
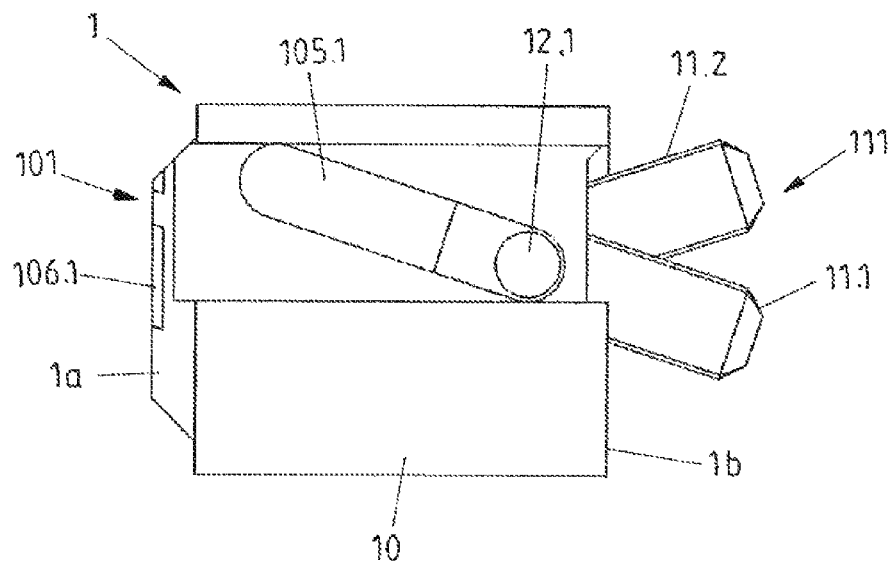
FIGS. 8A-8B show in views coinciding with FIGS. 7A-7B the chain link with adjustment parts extended in different adjustment directions.
Figure 8B:
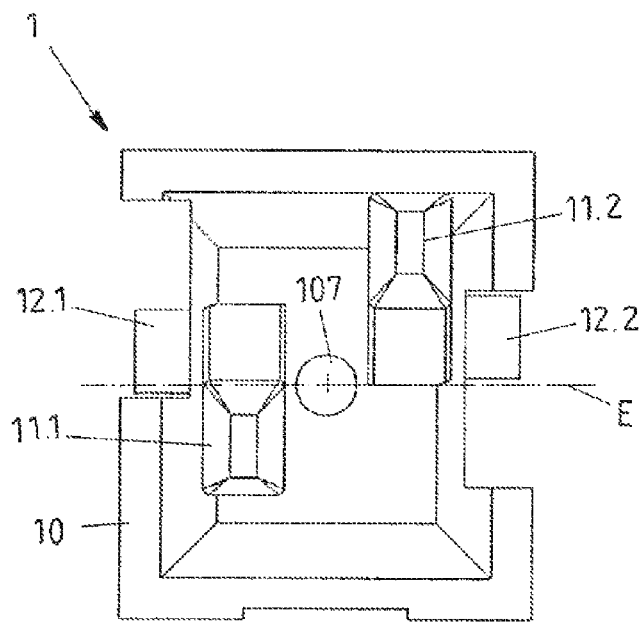

FIG. 3A, Sheet 6 of 17      delete "" and insert -- 0 --  
FIG. 4B, Sheet 8 of 17      delete "12 1" and insert -- 12.1 --

In the Claims  
In Column 17, Line 30, Claim 10      delete "linksis" and insert -- links is --

Signed and Sealed this  
Twenty-seventh Day of October, 2020

Andrei Iancu  
*Director of the United States Patent and Trademark Office*